(12) United States Patent
Morey

(10) Patent No.: US 6,357,684 B1
(45) Date of Patent: Mar. 19, 2002

(54) ADJUSTABLE TENSION FEED WHEEL ASSEMBLY FOR A WOOD CHIPPER

(75) Inventor: Michael Boyd Morey, Shepherd, MI (US)

(73) Assignee: Tramor, Inc., Remus, MI (US)

( * ) Notice: Subject to any disclaimer, the term of this patent is extended or adjusted under 35 U.S.C. 154(b) by 0 days.

(21) Appl. No.: 09/702,404

(22) Filed: Oct. 31, 2000

(51) Int. Cl.$^7$ ................................................ B02C 18/22
(52) U.S. Cl. ......................................... 241/301; 241/92
(58) Field of Search ....................... 241/92, 301, 101.78

(56) References Cited

U.S. PATENT DOCUMENTS

| | | |
|---|---|---|
| 190,675 A | 5/1877 | Gaines |
| 589,236 A | 8/1897 | Williams |
| 604,283 A | 5/1898 | Albrecht |
| 1,266,894 A | 5/1918 | Williams |
| 1,713,507 A | 5/1929 | Ammon |
| 1,752,290 A | 4/1930 | Ammon |
| 1,889,129 A | 11/1932 | Nielsen |
| 1,959,465 A | 5/1934 | Dryfoos |
| 2,026,790 A | 1/1936 | Mankoff |
| 2,128,194 A | 8/1938 | Sheldon |
| 2,244,577 A | 6/1941 | Schreiber |
| 2,318,219 A | 5/1943 | Harris |
| 2,392,958 A | 1/1946 | Tice |
| 2,658,318 A | 11/1953 | Miller |
| 2,663,505 A | 12/1953 | Sennholtz |
| 2,678,169 A | 5/1954 | Tullis |
| 2,710,635 A | 6/1955 | Alexander |
| 2,837,290 A | 6/1958 | Nagel |
| 2,863,476 A | 12/1958 | Clark |
| 2,864,420 A | 12/1958 | Schmidt |
| 3,030,037 A | 4/1962 | Raetz |
| 3,069,101 A | 12/1962 | Wexell |
| 3,076,489 A | 2/1963 | Schmidt et al. |
| 3,182,917 A | 5/1965 | Tamny et al. |
| 3,254,687 A | 6/1966 | Tertyshnikov |
| 3,276,700 A | 10/1966 | Eklund |
| 3,367,585 A | 2/1968 | Ratkowski |
| 3,436,028 A | 4/1969 | Koehnen et al. |
| 3,463,405 A | 8/1969 | Shepherd |
| 3,509,924 A | 5/1970 | Newhouse, Jr. |
| 3,559,724 A | 2/1971 | Wilkinson |
| 3,635,410 A | 1/1972 | Smith |
| 3,642,214 A | 2/1972 | Blackwell, Jr. |
| 3,844,494 A | 10/1974 | Hightower |
| 3,868,062 A | 2/1975 | Cunningham et al. |
| 3,907,016 A | 9/1975 | Nicholson et al. |
| 3,907,216 A | 9/1975 | MacKissic et al. |
| 3,936,004 A | 2/1976 | Graf et al. |
| 3,939,886 A | 2/1976 | Tucek |
| 3,989,198 A | 11/1976 | Blasko |
| 4,022,021 A | 5/1977 | Russell, Jr. |

(List continued on next page.)

FOREIGN PATENT DOCUMENTS

| | | |
|---|---|---|
| DE | 3624996 | 2/1988 |
| DE | 3808487 | 5/1989 |

Primary Examiner—Mark Rosenbaum
(74) Attorney, Agent, or Firm—Bliss McGlynn & Nolan, P.C.

(57) ABSTRACT

An adjustable tension feed wheel assembly for wood chipper includes a first feed wheel and a movable second feed wheel movable relative to the first feed wheel. The adjustable tension feed wheel assembly also includes a spring operatively interconnecting the first feed wheel and the second feed wheel to urge the second feed wheel toward the first feed wheel. The adjustable tension feed wheel assembly further includes an adjustment mechanism to delay a tension of the spring to allow the second feed wheel to move away from the first feed wheel against a force of gravity before the spring applies a spring force to the second feed wheel to urge the second feed wheel toward the first feed wheel.

20 Claims, 3 Drawing Sheets

U.S. PATENT DOCUMENTS

| | | |
|---|---|---|
| 4,074,594 A | 2/1978 | Dall et al. |
| 4,077,450 A | 3/1978 | Ackerman |
| 4,117,985 A | 10/1978 | Lazareck |
| 4,129,260 A | 12/1978 | Baker |
| 4,146,184 A | 3/1979 | Whitney |
| 4,162,769 A | 7/1979 | Lapointe |
| 4,168,035 A | 9/1979 | Palm et al. |
| 4,260,114 A | 4/1981 | Herder |
| 4,452,400 A | 6/1984 | Williams |
| 4,504,019 A | 3/1985 | Newell et al. |
| 4,527,604 A | 7/1985 | Everett |
| 4,544,104 A | 10/1985 | Carlsson |
| 4,560,110 A | 12/1985 | Burda |
| 4,685,624 A | 8/1987 | Nidiffer et al. |
| 4,687,179 A | 8/1987 | Smith |
| 4,692,028 A | 9/1987 | Schave |
| 4,702,424 A | 10/1987 | Widlak |
| 4,716,823 A | 1/1988 | Capdevila |
| 4,717,083 A | 1/1988 | Quast et al. |
| 4,721,257 A | 1/1988 | Williams et al. |
| 4,793,561 A | 12/1988 | Burda |
| 4,850,406 A | 7/1989 | Krautzberger |
| 4,872,500 A | 10/1989 | Duffey et al. |
| 4,906,486 A | 3/1990 | Young |
| 4,915,310 A | 4/1990 | Stelk |
| 4,917,314 A | 4/1990 | Manschwetus |
| 4,922,977 A | 5/1990 | Colton et al. |
| 4,967,969 A | 11/1990 | Griffith, III |
| 4,982,904 A | 1/1991 | Greiner |
| 5,005,620 A | 4/1991 | Morey |
| 5,018,672 A | 5/1991 | Peck et al. |
| 5,042,727 A | 8/1991 | Plante |
| 5,044,567 A | 9/1991 | Hte et al. |
| 5,078,328 A | 1/1992 | Willingham |
| 5,088,532 A | 2/1992 | Eggers et al. |
| RE33,840 E | 3/1992 | Peterson et al. |
| 5,114,085 A | 5/1992 | Inui |
| 5,167,374 A | 12/1992 | Strohmeyer |
| 5,205,496 A | 4/1993 | O'Donnell et al. |
| 5,209,278 A | 5/1993 | Carpenter et al. |
| 5,263,651 A | 11/1993 | Nadarajah |
| 5,285,974 A | 2/1994 | Cesarini |
| 5,358,189 A | 10/1994 | Vandermolen |
| 5,362,004 A | 11/1994 | Bateman |
| 5,372,316 A | 12/1994 | Bateman |
| 5,377,919 A | 1/1995 | Rogers et al. |
| 5,413,286 A | 5/1995 | Bateman |
| 5,474,239 A | 12/1995 | Williams, Jr. et al. |
| 5,526,988 A | 6/1996 | Rine |
| 5,667,152 A | 9/1997 | Mooring |
| 5,692,548 A | 12/1997 | Bouwers et al. |
| 5,988,539 A | 11/1999 | Morey |
| 6,000,642 A | 12/1999 | Morey |
| 6,016,855 A | 1/2000 | Morey |
| 6,032,707 A | 3/2000 | Morey et al. |
| 6,036,125 A | 3/2000 | Morey et al. |

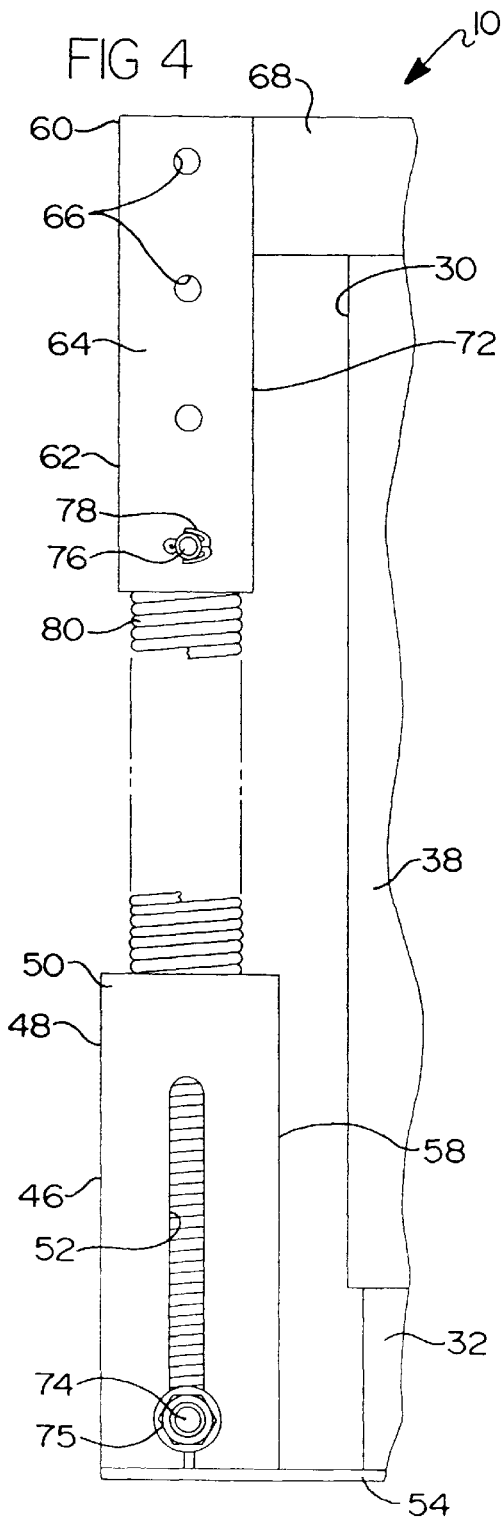

ADJUSTABLE TENSION FEED WHEEL ASSEMBLY FOR A WOOD CHIPPER

BACKGROUND OF THE INVENTION

1. Field of the Invention

The present invention relates generally to wood chippers and, more particularly, to an adjustable tension feed wheel assembly for a wood chipper.

2. Description of the Related Art

It is known to provide a wood chipper for chipping wood such as brush, branches, and the like to produce wood chips. One type of wood chipper known in the art includes an infeed chute, feed wheel assembly, and a cutting assembly having a rotatable disc with at least one knife or blade for chipping the wood entering the wood chipper and reducing it to wood chips. Typically, the feed wheel assembly includes a feed system having a stationary lower feed wheel connected to a lower housing and a movable upper feed wheel connected to an upper housing movable relative to the lower housing for allowing wood to enter the cutting assembly. The feed wheel assembly also includes a spring interconnecting the upper housing and the lower housing to urge the upper feed wheel toward the lower feed wheel to apply a spring force against the wood entering between the feed wheels to feed the wood to the cutting assembly.

Although this type of feed wheel assembly has worked well, it is desirable to adjust the tension of the spring to allow larger diameter wood entering the wood chipper to move the upper wheel only against the force of gravity under normal or extreme operating conditions. Therefore, there is a need in the art to provide an adjustable tension feed wheel assembly for a wood chipper to adjust the tension of the upper feed wheel toward the lower feed wheel to infeed wood by an operator to the cutting assembly while the cutting assembly is rotating.

SUMMARY OF THE INVENTION

Accordingly, the present invention is an adjustable tension feed wheel assembly for a wood chipper including a first feed wheel and a movable second feed wheel movable relative to the first feed wheel. The adjustable tension feed wheel assembly also includes a spring operatively interconnecting the first feed wheel and the second feed wheel to urge the second feed wheel toward the first feed wheel. The adjustable tension feed wheel assembly further includes an adjustment mechanism to delay a tension of the spring to allow the second feed wheel to move away from the first feed wheel against a force of gravity before the spring applies a spring force to the second feed wheel to urge the second feed wheel toward the first feed wheel.

One advantage of the present invention is that a new and adjustable tension feed wheel assembly is provided for a wood chipper. Another advantage of the present invention is that the adjustable tension feed wheel assembly allows the tension of an upper feed wheel toward a lower feed wheel to be adjusted. A further advantage of the present invention is that the adjustable tension feed wheel assembly allows the upper feed wheel to be raised during operation against the force of gravity for a predetermined distance before a spring force is applied to allow an operator to use less force in feeding wood to the cutting assembly. Yet a further advantage of the present invention is that the adjustable tension feed wheel assembly provides a delayed tension during operation.

Other features and advantages of the present invention will be readily appreciated, as the same becomes better understood, after reading the subsequent description when taken in conjunction with the accompanying drawings.

BRIEF DESCRIPTION OF THE DRAWINGS

FIG. 4 is an enlarged fragmentary elevational view of the adjustable tension feed wheel assembly of FIG. 1 illustrating a first operative position.

FIG. 5 is a view similar to FIG. 4 of the adjustable tension feed wheel assembly illustrating a second operative position.

DESCRIPTION OF THE PREFERRED EMBODIMENT(S)

Figure 1:
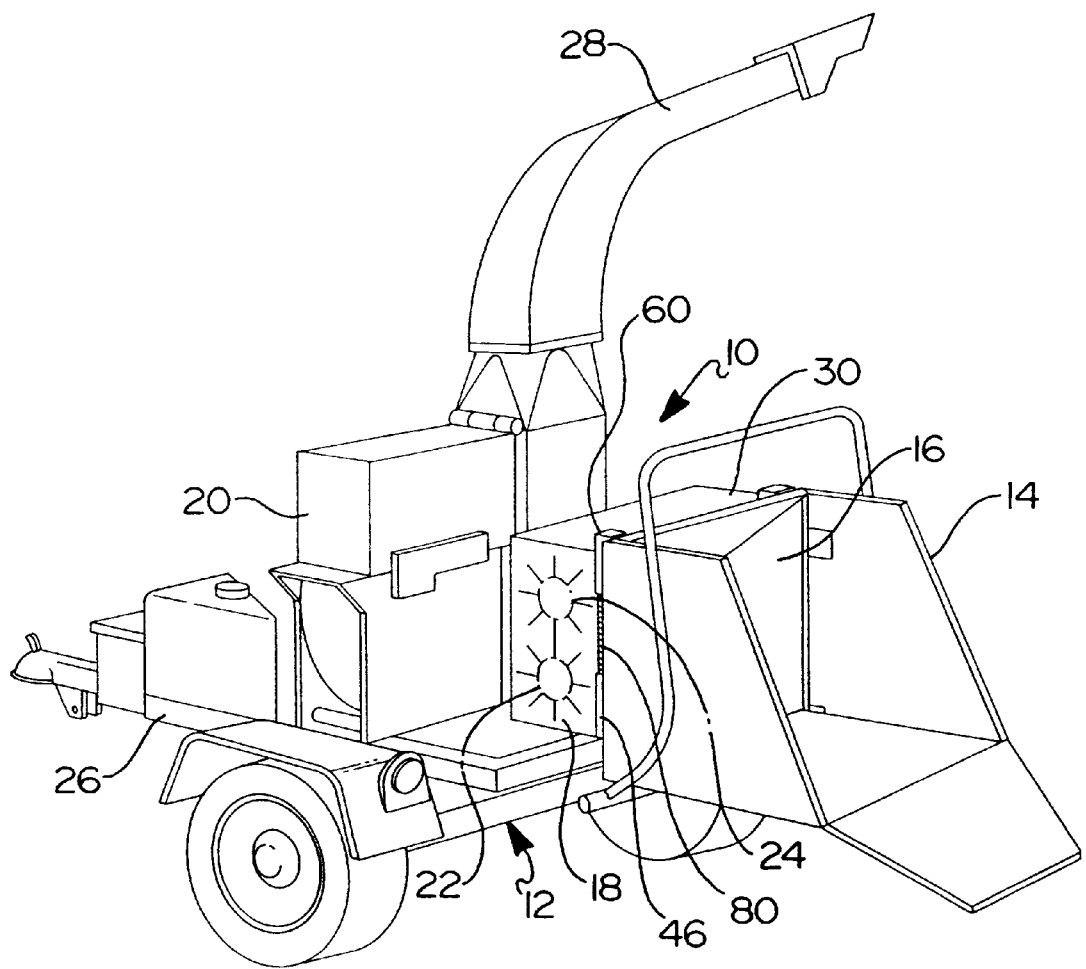
FIG. 1 is a perspective view of an adjustable tension feed wheel assembly, according to the present invention, illustrated in operational relationship with a wood chipper.
Figure 2:
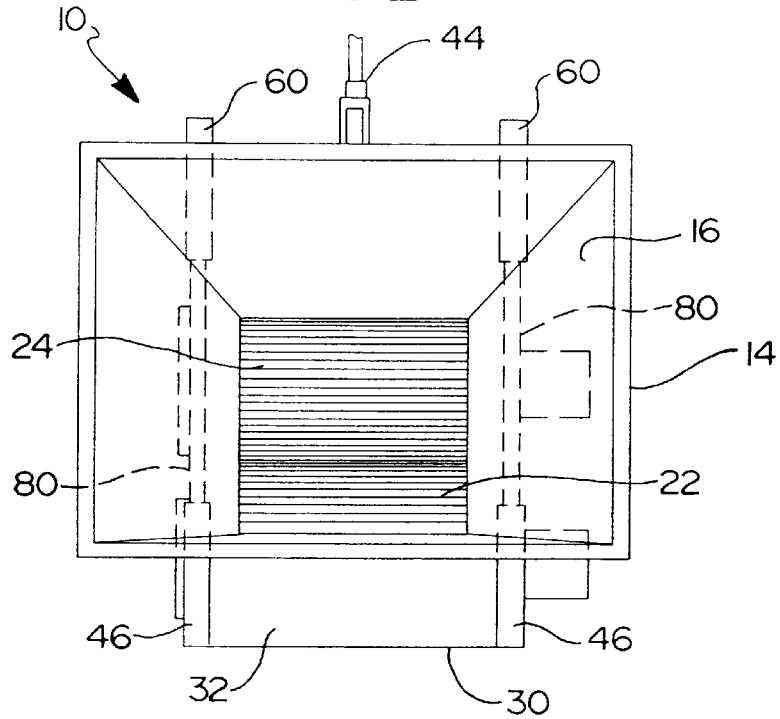
FIG. 2 is a side elevational view of the adjustable tension feed wheel assembly and wood chipper of FIG. 1.
Figure 3:
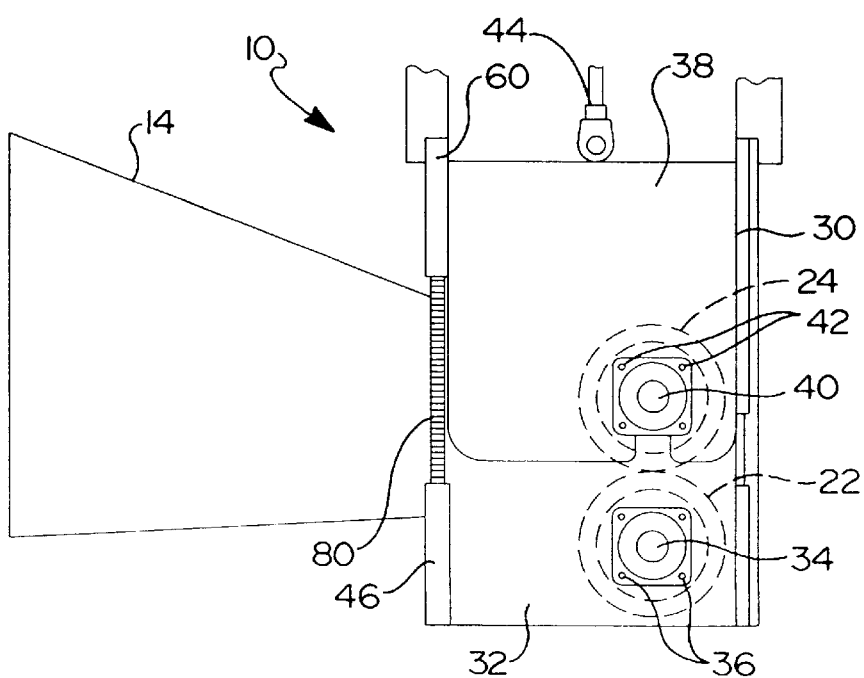
FIG. 3 is a front elevational view of the adjustable tension feed wheel assembly and wood chipper of FIG. 1.

Referring now to the drawings and in particular FIGS. 1 and 2, one embodiment of an adjustable tension feed wheel assembly 10, according to the present invention, is shown for a wood chipper, generally indicated at 12. The wood chipper 12 includes an infeed chute assembly 14 having an inlet 16 to allow wood material to enter the wood chipper 12. The wood chipper 12 also includes the adjustable tension feed wheel assembly 10 disposed between and adjacent to the infeed chute assembly 14 and a cutting assembly 20 for rotation about a horizontal axis adjacent to the adjustable tension feed wheel assembly 10. The adjustable tension feed wheel assembly 10 includes rotatable upper, lower or vertical feed wheels 22 and 24 for pulling and pushing the wood material from the infeed chute assembly 14 to the cutting assembly 20. The cutting assembly 20 includes a rotatable disc (not shown) having a plurality of blades (not shown) operatively connected to the disc for chipping the wood material. It should be appreciated that, in other embodiments, both feed wheels 22 and 24 may be moveable, more than two feed wheels 22 and 24 may be provided, or the feed wheels 22 and 24 may be located horizontally, vertically, or diagonally for the adjustable tension feed wheel assembly 10. It should be appreciated that, except for the adjustable tension feed wheel assembly 10, the wood chipper 12 is conventional and known in the art.

The wood chipper 12 includes an engine (not shown) mounted on a frame 26 and coupled to the adjustable tension feed wheel assembly 18 and cutting assembly 20 by suitable means to cause rotation of the feed wheels 22,24 and disc. The wood chipper 12 includes a rotatable shaft (not shown) operatively connected to the disc of the cutting assembly 20 and a pulley (not shown) disposed about one end of the shaft. The wood chipper 12 also includes a rotatable shaft (not shown) operatively connected to the engine and a pulley (not shown) disposed about the shaft (not shown). The wood chipper 12 further includes a belt or belts (not shown) disposed over and interconnecting the pulleys. It should be appreciated that the engine rotates a pump (not shown) that pumps hydraulic fluid to rotate the disc of the cutting assembly 20 and feed wheels 22 and 24 of the adjustable tension feed wheel assembly 10.

The wood chipper 12 includes an outlet or discharge chute 28 operatively connected to the cutting assembly 20. The discharge chute 28 is generally tubular and may be circular or rectangular in cross-sectional shape. The discharge chute 28 extends upwardly and away. It should be appreciated that the discharge chute 28 may have any suitable cross-sectional shape.

Referring to FIGS. 1 through 5, the adjustable tension feed wheel assembly 10 includes a housing 30 to surround and enclose the feed wheels 22 and 24. The housing 30 includes a first or lower housing 32 having a generally rectangular shape to support the lower feed wheel 22. The lower housing 32 is stationary and connected to the cutting assembly 20 by suitable means such as welding. The lower housing 32 has an inlet (not shown) on one side to receive wood material from the infeed chute assembly 14 and an outlet (not shown) on the other side to discharge wood material to the cutting assembly 20. The lower housing 32 supports a pair of opposed bearings 34. The bearings 34 are secured to the lower housing 32 by suitable means such as fasteners 36. It should be appreciated that the lower feed wheel 22 is disposed within the lower housing 32 and supported by the bearings 34 to rotate relative to the housing 30. It should also be appreciated that the lower housing 32 may have any suitable cross-sectional shape.

The housing 30 also includes a movable second or upper housing 38 disposed over the lower housing 32 and slidable relative to the lower housing 32. The upper housing 38 is generally rectangular in shape with a generally inverted U shape cross-section to enclose or cover the lower housing 32 and support the upper feed wheel 24. The upper housing 38 has an inlet (not shown) on one side to receive wood material from the infeed chute assembly 14 and an outlet (not shown) on the other side to discharge wood material to the cutting assembly 20. The upper housing 38 supports a pair of opposed bearings 40. The bearings 40 are secured to the upper housing 38 by suitable means such as fasteners 42. It should be appreciated that the upper feed wheel 24 is disposed within the upper housing 38 and supported by the bearings 40 to rotate relative to the housing 30. It should be appreciated that the upper housing 38 may have any suitable cross-sectional shape. It should also be appreciated that one end of the feed wheels 22 and 24 are operatively connected to the engine of the wood chipper 12 by suitable means such as the pump (not shown) to drive or rotate the feed wheels 22 and 24. The wood chipper 12 may have a hydraulic yoke 44 to allow an operator to slidably raise and lower the upper housing 38 relative to the lower housing 32. It should further be appreciated that the housing 30 and feed wheels 22 and 24 are conventional and known in the art.

The adjustable tension feed wheel assembly 10 includes a first or lower adjustment member 46 connected to the lower housing 32. The lower adjustment member 46 has a generally tubular or U-shaped cross-sectional shape. The lower adjustment member 46 has a base wall 48 and a pair of opposed side walls 50 extending generally perpendicular to the base wall 48. Each of the side walls 50 includes a slot 52 extending therethrough and axially therealong for a function to be described. The lower adjustment member 46 is secured to a lower plate member 54 by suitable means such as welding. The lower plate member 54 is secured to the lower housing 32 by suitable means such as welding. It should be appreciated that the lower adjustment member 46 has a channel 56 therein for a function to be described. It should also be appreciated that the lower adjustment member 46 may include a separate wall 58 opposing the base wall 48 or a wall of the lower housing 32.

The adjustable tension feed wheel assembly 10 includes a second or upper adjustment member 60 connected to the upper housing 38. The upper adjustment member 60 has a generally tubular or U-shaped cross-sectional shape. The upper adjustment member 60 has a base wall 62 and a pair of opposed side walls 64 extending generally perpendicular to the base wall 62. Each of the side walls 64 includes a plurality of apertures 66 extending therethrough and spaced axially therealong for a function to be described. The upper adjustment member 60 is secured to an upper plate member 68 by suitable means such as welding. The upper plate member 68 is secured to the upper housing 38 by suitable means such as welding. It should be appreciated that the upper adjustment member 60 has a channel 70 therein for a function to be described. It should also be appreciated that the upper adjustment member 60 may include a separate wall 72 opposing the base wall 62 or a wall of the upper housing 38.

The adjustable tension feed wheel assembly 10 includes a first or lower fastener 74 extending through the slots 52 in the lower adjustment member 46 and slideable therealong. The first fastener 74 may be of a bolt type extending through the slots 52 and secured by a nut 75 to prevent the first fastener 74 from exiting the slots 52. The adjustable tension feed wheel assembly 10 also includes a second or upper fastener 76 extending through one of the opposed pairs of apertures 66 in the upper adjustment member 60. The second fastener 76 may be of a pin type extending through the opposed apertures 66 and secured by a cotter key 78 on both ends to prevent second fastener 76 from exiting the apertures 66. The adjustable tension feed wheel assembly 10 further includes a spring 80 to urge the lower housing 32 and upper housing 38 and feed wheels 22 and 24 together in the closed position. The spring 80 is of a coil type having a first or lower end 82 disposed in the channel 56 of the first adjustment member 46. The first end 82 is disposed about and connected to the first fastener 74. The spring 80 has a second or upper end 84 disposed in the channel 70 of the upper adjustment member 60. The second end 84 is disposed about and connected to the second fastener 76. It should be appreciated that the spring 80 is in a normal or retracted position and the first end 82 may move with the first fastener 74 relative to the lower adjustment member 46.

In operation of the wood chipper 12, the engine rotates the cutting assembly 20 and hydraulically rotates the feed wheels 22 and 24 of the adjustable tension feed wheel assembly 10. Wood is fed into the inlet 16 of the infeed chute assembly 14 by an operator and is contacted by the adjustable tension feed wheel assembly 10 and fed to the cutting assembly 20. As the cutting assembly 20 rotates and contacts the wood, the wood is cut or chipped into wood chips, which move through the outlet of the cutting assembly 20 and are expelled out of the discharge chute 28. The wood fed into the inlet 16 contacts the upper feed wheel 24 which is allowed to move upwardly only against the force of gravity for the distance or length of the predetermined slots 52. The first end 82 of the spring 80 moves with the first fastener 74 as the first fastener 74 moves along the slots 52 to delay the tension applied by the spring 80. Once the first fastener 74 reaches or contacts the upper end of the slots 52, the first fastener 74 is stopped or fixed relative to the first adjustment member 46. If the upper feed wheel 24 is moved further upwardly, the spring 80 begins to stretch and applies a tension or spring force to the upper housing 38 and upper feed wheel 24 to urge the upper feed wheel 24 toward the lower feed wheel 22. It should be appreciated that the tension or spring force of the spring 80 may be adjusted by the placement of the second fastener 76 in another pair of apertures 66 prior to use. It should also be appreciated that the length of slots 52 may be varied to vary the distance before the tension or spring force is applied by the spring 80. It should further be appreciated that once the spring 80 is retracted there is no tension or spring force applied on the upper feed wheel 24 but only gravity.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. An adjustable tension feed wheel assembly for a wood chipper comprising:
   at least one first feed wheel;
   at least one second feed wheel movable relative to said first feed wheel;
   a spring operatively interconnecting said first feed wheel and said second feed wheel to urge said second feed wheel toward said first feed wheel; and
   an adjustment mechanism to delay a tension of said spring to allow said second feed wheel to move away from said first feed wheel against a force of gravity before said spring applies a spring force to said second feed wheel to urge said second feed wheel toward said first feed wheel.

2. An adjustable tension feed wheel assembly as set forth in claim 1 including a housing enclosing said first feed wheel and said second feed wheel.

3. An adjustable tension feed wheel assembly as set forth in claim 2 wherein said housing comprises a stationary first housing and a second housing movable relative to said first housing, said first feed wheel being connected to said first housing and said second feed wheel being connected to said second housing.

4. An adjustable tension feed wheel assembly as set forth in claim 3 wherein said adjustment mechanism comprises a first adjustment member operatively attached to said first housing and a second adjustment member operatively attached to said second housing, said spring being operatively attached to said first adjustment member and said second adjustment member.

5. An adjustable tension feed wheel assembly as set forth in claim 4 wherein said first adjustment member has at least one elongated slot.

6. An adjustable tension feed wheel assembly as set forth in claim 5 including a first fastener connected to a first end of said spring and extending through said at least one elongated slot.

7. An adjustable tension feed wheel assembly as set forth in claim 4 wherein said second adjustment member has at least two apertures extending therethrough and spaced therefrom.

8. An adjustable tension feed wheel assembly as set forth in claim 7 including a fastener connected to said second end of said spring and extending through one of said at least two apertures.

9. An adjustable tension feed wheel assembly as set forth in claim 4 wherein said first adjustment member comprises a base wall and a pair of opposed side walls extending from said base wall, said at least one slot extending through each of said side walls.

10. An adjustable tension feed wheel assembly as set forth in claim 4 wherein said second adjustment member comprises a base wall and a pair of opposed side walls extending from said base wall, said at least two apertures extending through one of said side walls and spaced therealong.

11. An adjustable tension feed wheel assembly for a wood chipper comprising:
    a first housing;
    a first feed wheel fixed relative to said first housing;
    a second housing movable relative to said first housing;
    a second feed wheel fixed relative to said second housing; and
    a spring operatively interconnecting said first housing and said second housing to urge said second feed wheel toward said first feed wheel; and
    an adjustment mechanism to delay a tension of said spring to allow said second feed wheel to move away from said first feed wheel against a force of gravity before said spring applies a spring force to said second feed wheel to urge said second feed wheel toward said first feed wheel.

12. An adjustable tension feed wheel assembly as set forth in claim 11 wherein said adjustment mechanism comprises a first adjustment member operatively attached to said first housing and a second adjustment member operatively attached to said second housing, said spring being operatively attached to said first adjustment member and said second adjustment member.

13. An adjustable tension feed wheel assembly as set forth in claim 12 wherein said first adjustment member has at least one elongated slot.

14. An adjustable tension feed wheel assembly as set forth in claim 13 wherein said first adjustment member comprises a base wall and a pair of opposed side walls extending from said base wall, said at least one slot extending through each of said side walls.

15. An adjustable tension feed wheel assembly as set forth in claim 13 including a first fastener connected to a first end of said spring and extending through said at least one elongated slot.

16. An adjustable tension feed wheel assembly as set forth in claim 15 wherein said second adjustment member comprises a base wall and a pair of opposed side walls extending from said base wall, said at least two apertures extending through one of said side walls and spaced therealong.

17. An adjustable tension feed wheel assembly as set forth in claim 12 wherein said second adjustment member has at least two apertures extending therethrough and spaced therefrom.

18. An adjustable tension feed wheel assembly as set forth in claim 17 including a fastener connected to said second end of said spring and extending through one of said at least two apertures.

19. An adjustable tension feed wheel assembly as said forth in claim 12 wherein said spring is a coil spring.

20. An adjustable tension feed wheel assembly for a wood chipper comprising:
    a first housing;
    a first feed wheel fixed relative to said first housing;
    a second housing movable relative to said first housing;
    a second feed wheel fixed relative to said second housing; and
    a spring operatively interconnecting said first housing and said second housing to urge said second feed wheel toward said first feed wheel; and
    means for delaying a tension of said spring to allow said second feed wheel to move away from said first feed wheel against a force of gravity before said spring applies a spring force to said second feed wheel to urge said second feed wheel toward said first feed wheel.

* * * * *